July 15, 1930.   W. BAUERSFELD   1,770,726
BELL SHAPED ILLUMINATING DEVICE
Filed Jan. 4, 1927
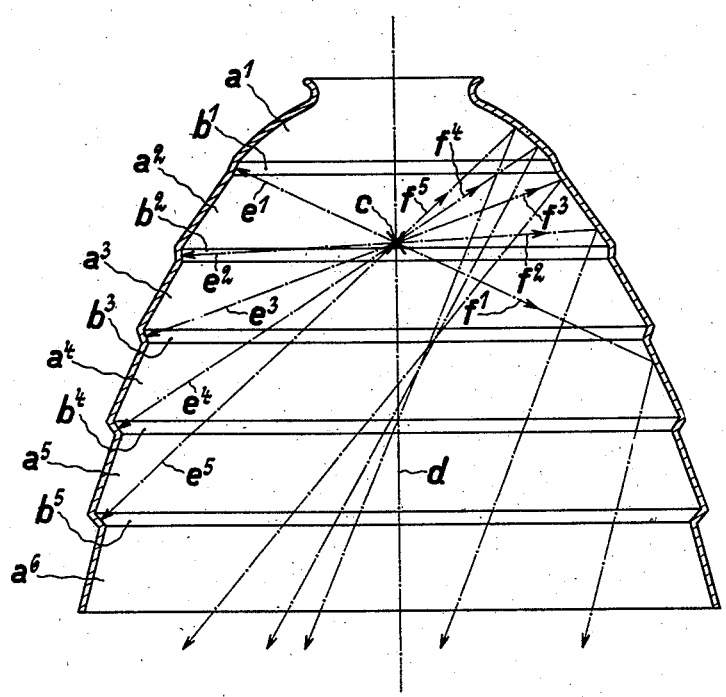

Patented July 15, 1930

1,770,726

UNITED STATES PATENT OFFICE

WALTHER BAUERSFELD, OF JENA, GERMANY, ASSIGNOR, BY MESNE ASSIGNMENTS, TO ZEISS IKON A.-G., GOERZWERK, OF BERLIN, GERMANY

BELL-SHAPED ILLUMINATING DEVICE

Application filed January 4, 1927, Serial No. 158,979, and in Germany January 22, 1926.

The well-known bell-shaped illuminating mirrors whose reflecting surface is formed by zones, displaced relatively to each other like steps, are sometimes constructed in such a way that the zones are at any one time outwardly displaced relatively to the adjacent smaller zones. If in such mirrors the angle of the luminous field radiated by them is only to be small, there results a comparatively large diameter, which in many a case is unsuitable for the desired purpose. An optional reduction of this aperture, however, is thereby delimited that the zones, adjacent to the vertex of the mirror, must yet admit of an unrestricted introduction of the source of light to be used with the mirror (e. g. a glow lamp), whose dimensions are fixed. According to the present invention a comparatively small aperture is also attained for small angles of the luminous field owing to the fact that the zones of the mirror are at any one time displaced relatively to the adjacent smaller zones towards the mirror axis.

The mirror may be composed of single constructional parts, each of which represents one zone, or consist of one piece. In the latter case it is necessary, in order to connect the zones to each other, to provide connecting surfaces for the selection of which it is decisive that the loss of light connected therewith shall be confined to the smallest possible amount. According to the invention this is attained by uniting the zones by means of spherical surfaces whose centres lie at the locus of the source of light. The luminous rays incident on these connecting surfaces are thereby reflected in the direction of incidence and again act in such a way as if they directly emanated (only weakened by the loss of absorption) from the source of light. In order to avoid any further unnecessary loss of absorption it must be seen to that the rays, after having been reflected, do not strike again connecting but zonal surfaces which may be achieved by imparting to the single zones a corresponding width. In this manner the said rays join in the shortest way the illuminating pencil radiated by the mirror.

The annexed drawing shows in a constructional form an example of the new illuminating device in a cross section.

The mirror, which may consist of plate-glass or metal, contains zones $a^1$, $a^2$ ..., united by connecting surfaces $b^1$, $b^2$ ... These connecting surfaces $b^1$, $b^2$ ... form themselves spherical surfaces whose centre $c$, which is assumed to be the locus of the source of light, lies on the axis $d$ of the mirror which axis thus simultaneously forms the axis of the radiated pencil of luminous rays. The width of the zones $a^1$, $a^2$ ... is so chosen that luminous rays $e^1$, $e^2$, ... striking the connecting surfaces $b^1$, $b^2$, ... are thrown on the way denoted by arrows $f^1$, $f^2$ ... onto the surfaces of the zones $a^1$, $a^2$ ... where they undergo their second and last deflection.

I claim:

Bell-shaped illuminating device comprising a source of light and a mirror, the reflecting surface of which is composed of zones displaced relatively to each other like steps and directed towards the source of light so as to reflect light emanated from the source of light, the zones running round the axis of the mirror on the whole circumference of the same and being at any one time displaced relatively to the adjacent smaller zones towards the mirror axis, the zones being connected with each other by spherical surfaces whose centres coincide at a point of the mirror axis and the zones of the mirror being of such construction that always opposite one spherical surface with regard to its centre lies one of the said zones.

WALTHER BAUERSFELD.